US007950267B2

(12) United States Patent
Vandyke et al.

(10) Patent No.: US 7,950,267 B2
(45) Date of Patent: May 31, 2011

(54) LIQUID PROPANE GAS INJECTOR TESTING SYSTEM AND METHODS

(75) Inventors: Victor Vandyke, Excelsior, MN (US); Kevin Michael Wolter, Saint Paul, MN (US); Thomas Arnold Kulenkamp, Saint Paul, MN (US)

(73) Assignee: Bi-Phase Technologies, LLC, Eagan, MN (US)

( * ) Notice: Subject to any disclaimer, the term of this patent is extended or adjusted under 35 U.S.C. 154(b) by 445 days.

(21) Appl. No.: 12/182,753

(22) Filed: Jul. 30, 2008

(65) Prior Publication Data

US 2010/0024516 A1 Feb. 4, 2010

(51) Int. Cl.
*G01F 1/72* (2006.01)
*G01G 1/76* (2006.01)

(52) U.S. Cl. ............ 73/1.72; 73/1.16; 73/1.26; 73/1.36; 73/1.71; 73/1.74

(58) Field of Classification Search .................. 73/1.01, 73/1.16, 1.26, 1.36, 1.71, 1.72, 1.74
See application file for complete search history.

(56) References Cited

U.S. PATENT DOCUMENTS 3,423,998 A * 1/1969 Blomgren, Jr. ............ 73/114.52
4,088,012 A * 5/1978 Emerson .................... 73/114.48
4,171,638 A * 10/1979 Coman et al. .............. 73/114.42
4,266,426 A * 5/1981 Gandini ..................... 73/114.41
4,348,894 A * 9/1982 Emerson et al. ........... 73/114.52
4,488,429 A * 12/1984 Ito .............................. 73/114.47
4,569,227 A * 2/1986 Adolph ...................... 73/114.41
4,788,858 A * 12/1988 Liebermann ............... 73/114.48
4,845,979 A * 7/1989 Farenden et al. .......... 73/114.45
5,291,869 A 3/1994 Bennett
5,325,838 A 7/1994 Bennett
5,423,303 A 6/1995 Bennett
5,878,771 A * 3/1999 Mayeaux ........................ 137/88
6,016,459 A * 1/2000 Isaac et al. .................... 701/102
6,036,296 A * 3/2000 Axtell et al. ...................... 347/7
6,216,675 B1 4/2001 Bennett
6,227,173 B1 5/2001 Bennett
6,234,002 B1 * 5/2001 Sisney et al. ................... 73/1.57
6,314,947 B1 11/2001 Roche
6,484,573 B2 * 11/2002 Bundock et al. ........... 73/114.48
6,561,164 B1 * 5/2003 Mollin .......................... 123/446
7,080,550 B1 * 7/2006 Goris et al. ................ 73/114.48
7,171,847 B2 * 2/2007 Kuhn ......................... 73/114.48
7,370,520 B2 * 5/2008 Kortsen ..................... 73/114.45
7,716,964 B2 * 5/2010 Kurtz et al. .................. 73/11.04
2001/0032620 A1 * 10/2001 Bundock et al. .............. 123/457
2002/0175521 A1 * 11/2002 Dunsworth et al. ........ 290/40 A
2003/0083801 A1 * 5/2003 Mollin .......................... 701/104
2004/0250600 A1 * 12/2004 Bevers et al. .................. 73/1.16
2005/0150271 A1 * 7/2005 Klopfer et al. ................. 73/1.36

* cited by examiner

*Primary Examiner* — David A. Rogers
(74) *Attorney, Agent, or Firm* — Merchant & Gould P.C.

(57) ABSTRACT

Methods and systems for determining an LPG fuel output characteristic of an LPG injector. The output characteristic of the LPG can be determined by calculating a total mass of LPG injected into a canister of known volume by the injector during a plurality of open/closed cycles of the injector. The pressure differential and temperature in the canister can be used in the calculation of total LPG mass along with a gas constant of the LPG and the volume of the canister. The total LPG mass can then be used to determine the mass of LPG injected by the injector during each open/closed cycle.

20 Claims, 4 Drawing Sheets

LIQUID PROPANE GAS INJECTOR TESTING SYSTEM AND METHODS

TECHNICAL FIELD

The present disclosure relates to fuel injection systems. More specifically, the present disclosure relates to fuel injector testing systems and methods.

BACKGROUND

Liquefied petroleum gas ("LPG") fuel supply systems are known, for example, as shown in U.S. Pat. Nos. 5,291,869; 5,325,838; 5,423,303; 6,216,675; and 6,227,173, which patents are incorporated herein by reference in their entirety. Such systems typically include a number of specialized fuel injectors which receive fuel from a high pressure tank. A fuel rail connected in-line with a series of injectors is often employed to deliver supply fuel to the injectors. In many systems, uninjected fuel is returned to the fuel tank. This is generally done to keep the supply fuel as cool as possible, particularly where it is intended to inject LPG in liquid rather than gaseous form.

One approach to injecting LPG without permitting it to vaporize prior to or during injecting is to pump high volumes of supply and return fuel to the fuel injectors. In this way, the supply fuel spends very little time near the heated engine compartment where it can vaporize. Another approach is to employ a refrigeration cycle as described in those patents identified above. The evaporation of return fuel is used to cool supply fuel, thereby maintaining it in liquid form.

Due to the low evaporation temperature of LPG (i.e., evaporates at minus 40° F.), maintaining LPG in a liquid state can pose various challenges. One such challenge relates to calibration of an LPG injector. For these and other reasons, improvements in calibration systems and methods are desirable.

SUMMARY

The above and other problems are solved in accordance with the present disclosure by the following:

In one aspect, methods and systems for determining an LPG fuel output characteristic or parameter of an LPG injector are described. The output characteristic of the LPG can be determined by calculating a total mass of LPG injected into a canister of known volume by the injector during a plurality of open/closed cycles of the injector. The pressure differential and temperature in the canister can be used in the calculation of total LPG mass along with a gas constant of the LPG and the volume of the canister. The total LPG mass can then be used to determine the mass of LPG injected by the injector during each open/closed cycle.

The above summary is not intended to describe each disclosed embodiment or every implementation of the inventive aspects disclosed herein. Figures in the detailed description that follow more particularly describe features that are examples of how certain inventive aspects may be practiced. While certain embodiments are illustrated and described, it will be appreciated that disclosure is not limited to such embodiments.

DETAILED DESCRIPTION

Figure 1:
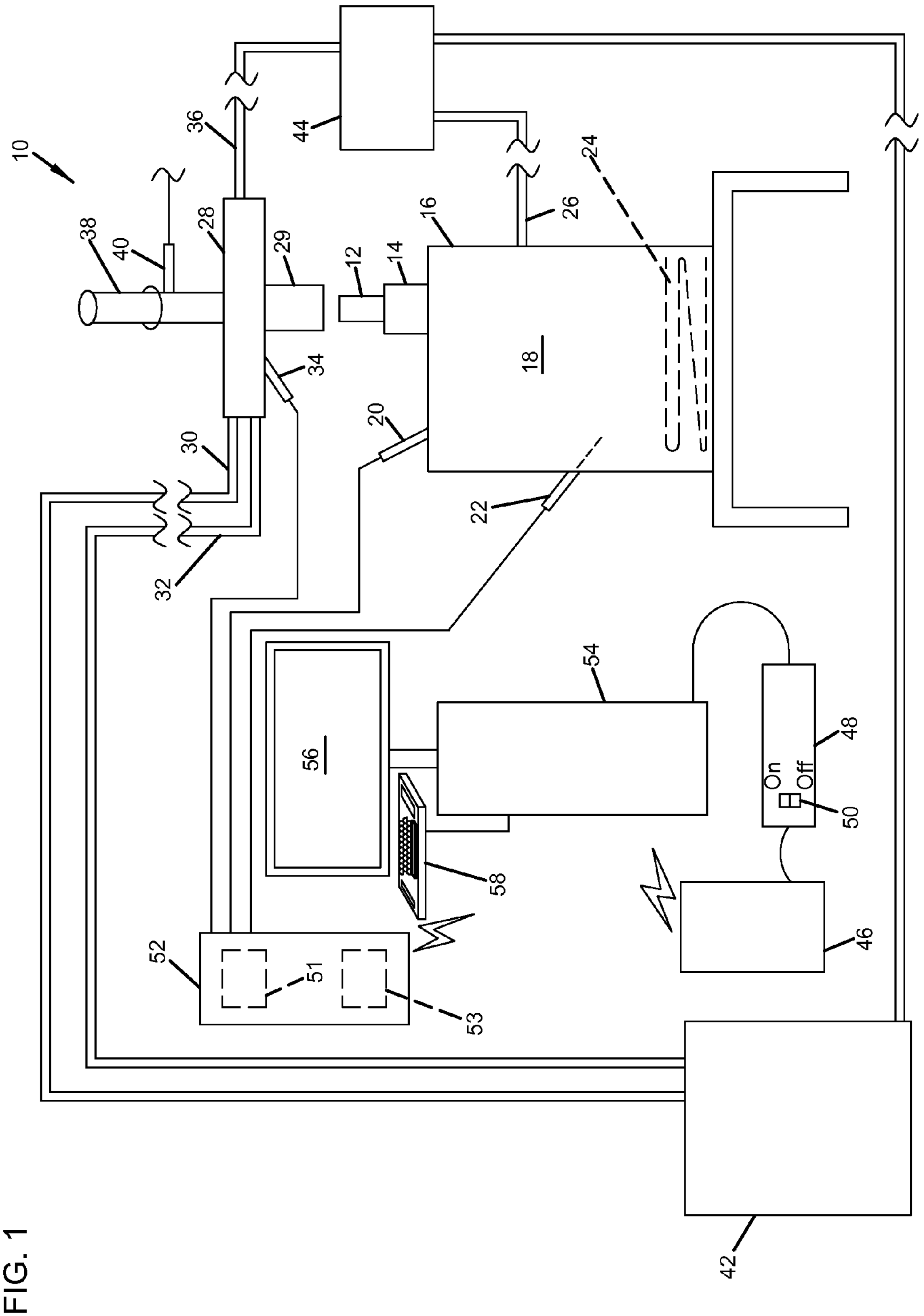
FIG. 1 is a schematic representation of an example injector test system in accordance with principles of the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many embodiments possible.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

In general, the present disclosure relates to methods and systems for testing and calibrating LPG injectors. The methods and systems disclosed monitor parameters of the fuel such as pressure and temperature before and after the LPG is injected from the injectors with a known number of injection bursts into a container of known volume. Using the gas constant for gas along with the measured temperature and pressure differential, a total mass of the fuel injected into the container can be determined. The total mass of fuel can be used to determine the mass of fuel per burst of fuel from the injector.

A burst of fuel from the injector (also referred to as a burst cycle) is defined as the amount of time the injector is in an open state during a predetermined interval of time. In one example, the predetermined interval of time is about 20 milliseconds (ms) and the injector is in the open state about 17 to 18 ms and in a closed state about 2 to 3 ms during the predetermined time interval. This example burst scenario is sometimes referred to as a "full throttle burst." A full throttle burst can generally be defined as a burst wherein the injector is in the open state a greater amount of time than in a closed state during the predetermined time interval, and more preferably defined as having an open state at least 75% of the predetermined time interval.

Another example burst is sometimes referred to as an "idle burst." An idle burst can generally be defined as a burst wherein the injector is in the open state an amount of time less than the amount of time the injector is in a closed state during a predetermined time period, and more defined as having an open state of 25% or less of the predetermined time interval. In one example idle burst scenario, the predetermined time period is about 20 ms, the injector is in an open state about 2 to 3 ms and in the closed state about 17 to 18 ms.

Referring now to FIG. 1, methods and systems for testing and calibration of LPG injectors are shown according to a possible embodiment of the present disclosure. An LPG injector system 10 operates to provide a supply of LPG, monitor parameters of the fuel and operation of a fuel injector, and determine at least one performance parameter of the fuel injector such as a mass of fuel injected per burst cycle of the fuel injector. The system 10 can have many different features and functionality. Further example configurations, related functions and methods of operation are also described below with reference to FIGS. 2-4.

Although alternatives are possible, the system 10 generally includes, an injector mounting base 14 configured to receive an LPG injector 12, a canister 16 defining an internal volume 18, a canister pressure sensor 20, a canister temperature sensor 22, a heater 24, and a canister vacuum return line 26. The canister 16 (also referred to interchangeably herein as a container) can have any desired shape and size. In one example, the canister 16 has an internal volume of about 2.5 liters and has a generally cylindrical shape with a circular cross section and generally planar opposing end surfaces.

The canister pressure sensor 20 is positioned or otherwise configured to monitor a pressure condition within the internal volume 18. The canister temperature sensor 22 is configured to monitor a temperature condition within the internal volume 18. While alternatives are possible, the heater 24 is typically positioned in the injector mounting base 14. Alternatively, the heater 24 can be at least partially positioned within the internal volume 18 as shown in FIG. 1. In other examples, the heater 24 is positioned at least partially along an exterior of the canister 16 or at least partially embedded within a wall structure of the canister 16 or a wall structure of the injector mounting base 14.

The heater 24 can be activated to warm the propane as it exits the injector 12 into the internal volume 18. Typically, the heater 24 helps warm the propane to about room temperature (i.e., about 65 to about 75° F., more preferably about 69 to about 71° F., and most preferably about 70° F.). Although alternatives are possible, in one arrangement the heater 24 is activated to help maintain internal volume 18 in a temperature range of about room temperature. The heater 24 is usually controlled by a timer that controls on/off operation of the heater 24 based on other functions of the system 10 such as when the injector 12 is turned on or off. Control of heater 24 can be influenced in part by temperature feedback signals generated by canister temperature sensor 22 to help achieve and maintain the desired temperature within the internal volume 18.

The canister vacuum return line 26 can be positioned or otherwise configured to apply a vacuum pressure condition to the internal volume 18. Applying a vacuum pressure condition to the internal volume 18 can help remove fluids from within the internal volume 18 such as, for example, LPG that has been injected by injector 12. The canister vacuum return line 26 can also be used to return the internal volume 18 to atmospheric pressure condition after the vacuum pressure condition has been applied.

The system 10 can also include a loading arm 28 that has a number of additional components mounted or otherwise coupled thereto. Some such possible features include an injector connector 29, a fuel supply line 30, a fuel return line 32, a loading arm pressure sensor 34, a loading arm vacuum return line 36, an actuator 38, and a safety interlock sensor 40.

The injector connector 29 is configured to connect in fluid communication with an LPG injector (e.g., the LPG injector 12 positioned in the injector mounting base 14). The injector connector 29 is coupled in fluid communication with the fuel supply line 30, the fuel return line 32 and the loading arm vacuum return line 36. During operation of the LPG injector 12, a constant flow of fuel is provided to the LPG injector 12 via fuel flow through the fuel supply line 30 and back to a source of fuel via the fuel return line 32. After operation of the LPG injector 12 when the fuel flow via the supply and return lines 30, 32 is terminated, a vacuum pressure condition can be applied internal of the loading arm 28 to remove any fluids positioned therein (i.e., LPG in a gas or liquid state). Typically, removing any excess fuel from the loading arm 28 prior to disconnecting the injector connector 29 from the LPG injector 12 can reduce inadvertent exposure of the operator of system 10 to LPG.

The actuator 38 can be configured to initiate sealed connection between the injector connector 29 and the LPG injector 12. In one example, the actuator 38 provides movement of at least a portion of a loading arm 28 relative to the LPG injector 12 to provide fluid communication connection between the injector connection 29, the injector 12 and the injector mounting base 14. One example arrangement for the actuator 38 is a linkage arrangement actuatable by a handle or lever that moves at least the injector connector 29 relative to a stationary injector 12. In other arrangements, the injector 12 is pre-mounted in the injector connector 29 and the actuator 38 moves the pre-mounted injector 12 into fluid communication engagement with the injector mounting base 14.

Further arrangements are possible for the actuator 38, injector 12, and injector mounting base 14. In one example, the injector 12 is oriented generally horizontally as opposed to the generally vertical orientation shown in FIG. 1. The actuator 38 can be operable as part of the loading arm 28 or mounted to other features of the system 10. In one example arrangement, the actuator 38 is mounted to a portion of the canister 16 or a portion of the injector mounting base 14 to assist in mounting and dismounting of the injector 12 relative to the system 10.

The safety interlock sensor 40 can be arranged or otherwise configured to confirm various actuated states of the actuator 38. In one example, the safety interlock sensor 40 monitors a position of an actuator handle or actuator lever of the actuator 38 to confirm when the actuator 38 is in a state that confirms a sealed connection of the injector 12 with the system 10 or a state indicating a sealed connection of the injector 12 relative to the system 10 is not present. The safety interlock sensor 40 can determine a position or state of the actuator 38 using technology such as, for example, infrared, sonar, radio frequency (RF), or magnetic (e.g., Hall effect) sensors.

The system 10 can further include a fuel supply tank 42. The fuel supply tank 42 can be specially configured to handle LPG fuel (i.e., deliver LPG in a liquid form from the supply tank to a point of use via the fuel supply and fuel return lines 30, 32). An example fuel supply tank and related fuel supply system for use with LPG is disclosed in U.S. Pat. Nos. 6,216,675, 6,227,173 and 6,314,947, which patents are incorporated herein by reference in their entirety.

The fuel recycle system 44 can be coupled in fluid communication with the canister vacuum return line 26 and the loading arm vacuum return line 36. The fuel recycle system 44 receives the LPG stored in the internal volume 18 of canister 16 and from within the loading arm 28 and injector 12 in either gaseous or liquid form. The fuel collected by fuel recycle system 44 can be filtered and changed to a liquid state. The recycled liquid fuel can then be returned to, for example, the fuel supply tank 42 for reuse in the system 10. Alternatively, the recycled fuel can be burned or otherwise disposed of as desired. While FIG. 1 illustrates a flow connection between fuel supply tank 42 and the fuel recycle system 44, such a return flow of recycled fuel from the fuel recycle system 44 is not required.

The system 10 can also include a plurality of features and components related to controls and power supply for system 10. Some examples of such features include a power supply 46, an on/off control 48 having an on/off switch 50, a control panel 52, a processor 54, a display monitor 56, and a keyboard 58. The power supply 46 can be any standard power supply. In one example, the power supply 46 provides a power source that simulates a vehicle battery, for example, in the range of about 12 to 16 volts, and more preferably about 14 volts. The power supply 46 can provide power to a plurality of features and components of system 10 such as, for example, the on/off control 48, the control panel 50, the processor 54, and the monitor 56.

The on/off control 48 can be configured with a simple on/off switch 50 that initiates activation of a test cycle using system 10. The on/off control 48 can control, for example, on/off operation, testing, feedback, calculations, initiation of algorithms, and other features of system 10 with a single activation of on/off switch 50. In other arrangements, it is possible to have a plurality of on/off switches as part of the on/off control 48, wherein each of the plurality of switches are used to control one or more features and functionality of system 10. In still further arrangements, the on/off control 48 can be used in combination with or can be replaced by individual on/off control features for the various components of system 10 such as, for example, the pressure sensors 20, 34, the heater 24, the temperature sensor 22, the safety interlock sensor 40, opening and closing of the fuel lines 30, 32, and functionality of the control panel 52 and processor 54.

The control panel 52 can be generally configured a junction box for much of the cabling used in system 10. The control panel 52 can include a controller 51 and a control board 53. The control board 53 acts as an interface to the processor 54 to convert outputs from processor 54 into outputs that are capable of driving components of the system 10 such as relays and solenoids. The control panel 52 can also perform signal conditioning from the pressure transducers of the system 10 to provide acceptable signals to the processor 54. In one example, the controller 51 is a Campbell CR 10X controller. The processor 54 can include built in analog and digital I/O that is used to monitor and control the test processes of system 10. A real-time status of the system 10 can be displayed on the monitor 56. The processor 54 can communicate with the controller 51 using, for example, a RS232 communications link. The keyboard 58 can be any data entry device used to provide entry and communication with the processor 54.

The power supply 46, control panel 52, and processor 54 can be coupled together using any one of a variety of technologies including, for example, hardwiring (e.g., USB connections), wireless communication and the like. Likewise, the various sensors 20, 22, 34, 40 and other electronically activated and monitored features of system 10 can communicate with any one of the power supply 46, control panel 52, and processor 54 with different connection arrangements. Typically, two-way communication is provided between the various electronic components of system 10 (i.e., between the sensors 20, 22, 34 and control panel 52) to provide feedback and control capabilities.

Figure 2:
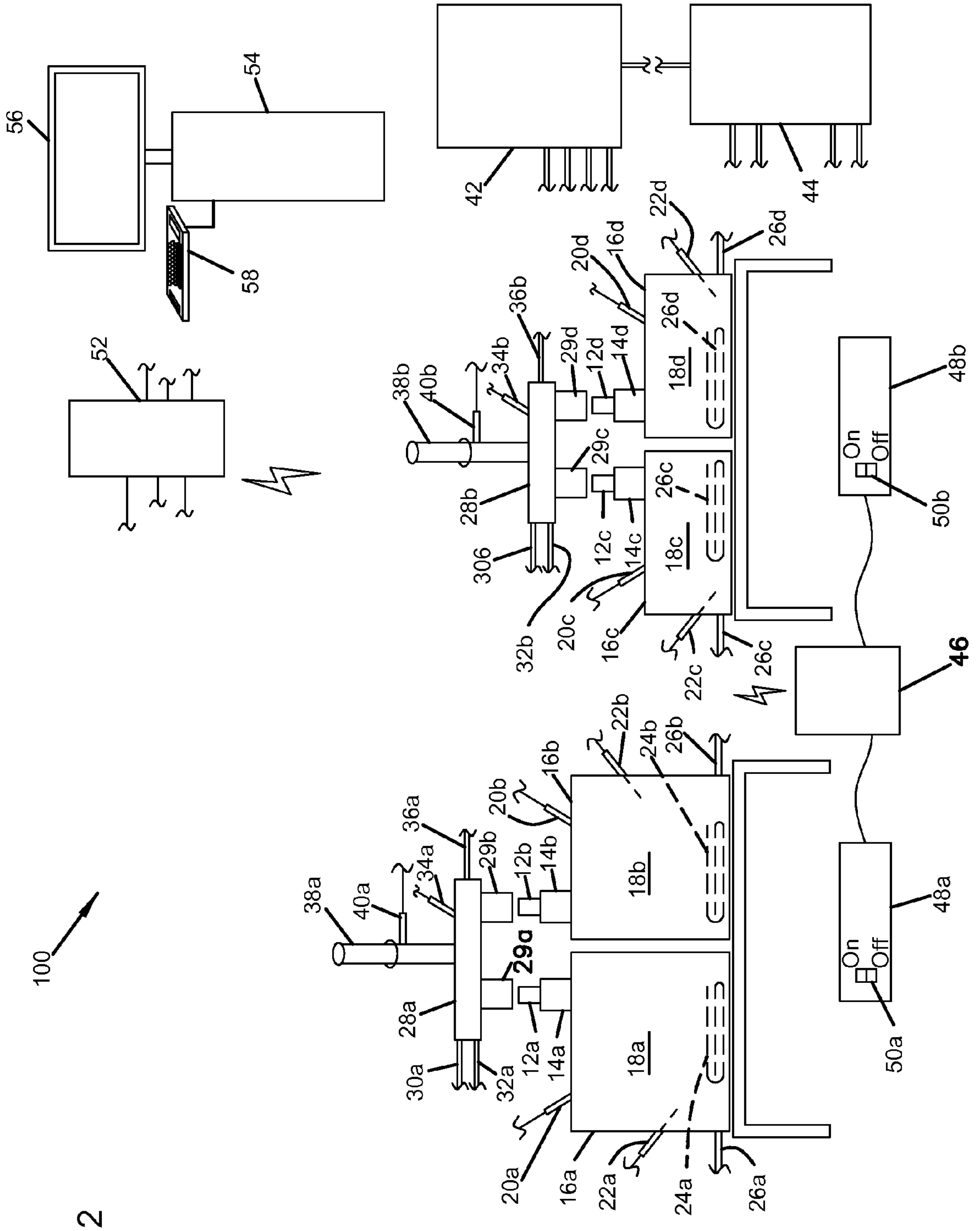
FIG. 2 is a schematic representation of another example injector test system in accordance with principles of the present disclosure.

Referring now to FIG. 2, another example LPG injector test system 100 is shown and described. System 100 includes many of the same features and functionality as the system 10 described above. Although alternatives are possible, the system 100 generally includes two separate test stations, wherein each test station includes a pair of canisters each having a predetermined internal volume capable. Each test station is capable of concurrently testing at least one LPG injector and typically two or more LPG injectors. The test stations can be coupled in electronic and fuel communication with a single fuel supply tank 42, fuel recycle system 44, power supply 46, control panel 52, processor 54, monitor 56 and keyboard 58. A separate on/off control 46A-B having on/off switches 50A-B can be used for each of the stations. In one arrangement, a pair of canisters 16A-B of a first test station have a first internal volume while the canisters 16C-D of a second test station have a second internal volume different from the first internal volume. In other arrangements, one test station can have one or more canisters of a first internal volume and one or more canisters of a second internal volume that is different than the first internal volume.

The system 100 shown in FIG. 2 generally includes the includes, for example, canisters 16A-D having related internal volumes 18A-D, injector mounting bases 14A-D configured to mount or otherwise support a plurality of LPG injectors 12A-D, canister pressure sensors 20A-D, canister temperature sensors 22A-D, heaters 24A-D, and canister vacuum return lines 26A-D.

The system 100 can also include loading arms 28A-B (i.e., one loading arm for each station), injector connectors 29A-D, fuel supply lines 30A-B, fuel return lines 30A-B, loading arm pressure sensors 34A-B, loading arm vacuum return lines 36A-B, actuators 38A-B, and safety interlock sensors 40A-B. Typically, a given loading arm 28A-B is associated with a single one of the actuators 38A-B, wherein actuation of the actuator 38A-B provides a connection between the injector connectors 29A-D and the injectors 12A-D.

In other arrangements, more than two injector connectors can be associated with a single loading arm, and more than two canisters can be associated with a single loading arm. Many other arrangements and variations in combinations of those components shown in FIG. 2 are possible for system 100 and other systems in accordance with principles of the present disclosure.

The systems 10, 100 described in detail above with reference to FIGS. 1 and 2 can be used in operation to determine characteristics of the LPG injectors tested therein. The LPG injectors (some examples of which are disclosed in U.S. Pat. No. 5,823,446, which is incorporated herein by reference in its entirety) are coupled in fluid communication with a flow of LPG fuel, and dispense the LPG fuel in a liquid form into an enclosed environment wherein the LPG is immediately transformed into a gas state.

Referring to the system 10 described above, the flow of LPG fuel can be provided by the supply and return lines 30, 32 to the loading arm 28 and in the injector connector 29. The injector 12 dispenses LPG into the internal volume 18 of the canister 16 as a liquid. However, the internal volume 18 of the canister 16 has a temperature and pressure condition that cause the LPG dispensed by the injectors 12 to immediately change from a liquid state to a gas state. In one example, the internal volume 18 is maintained at room temperature (i.e., a temperature in the range of about 65 to 75° F., and more preferably about 70° F.), and a pressure less than 140 psi. LPG typically has a boiling point of 70° F. at a pressure condition of 140 psi. Thus, if the internal volume 18 is maintained at a lower temperature (i.e., less than 70° F.) then the pressure condition within the internal volume 18 can reach a level higher than 140 psi without the LPG returning to a liquid state.

The pressure and temperature condition of the internal volume 18 is intended to simulate conditions of a combustion engine wherein the injector can be used in one application. A combustion engine requires input of LPG in a gaseous state for optimum combustion and efficiency in burning the LPG.

For a given canister volume, with desired temperature and pressure conditions as described above (i.e., about 70 degrees Fahrenheit and less than 140 psi), a burst configuration and number of burst cycles can be designed for testing certain mass per burst characteristics of the injector. The following illustrates two sets of parameters for two different canister volumes using the first and second example burst cycles described above (e.g., full throttle and idle burst cycles). The number of burst cycles is selected within a range wherein the total input of LPG into the canister volume does not create a pressure condition in excess of 140 psi while still providing a maximum pressure differential between an empty canister volume prior to the burst cycles and a fuel-filled canister volume at completion of the burst cycles.

TABLE 1

| | Example #1 | Example #2 |
|---|---|---|
| Canister volume | 2.5 Liter | 1 Liter |
| Burst Cycle | 17.5 millisecond open/ 2.5 millisecond closed | 2.5 open/17.5 closed |
| Temperature | 70° Fahrenheit | 70° Fahrenheit |
| Maximum Pressure | 140 psi | 140 psi |
| Number of Burst Cycles | 100 | 700 |

The temperature within canister volume 18 can be regulated using the heater 24 and monitored with temperature sensor 22. The pressure sensor 20 can be used to determine the pressure prior to fuel input and after completion of fuel input for a pressure differential determination. The temperature sensor can have a continuous monitoring capability to help determine a change in temperature during input of fuel into the canister volume 18. Such continuous temperature feedback (i.e. in the form of temperature signals generated by temperature sensor 22) can be used to determine how long the heater is turned on and the amount of heat that must be generated by the heater 24 to attain and maintain the desired temperature (e.g., room temperature). In some instances, a delay can be provided after input of fuel into the canister volume 18 to facilitate stabilization of the temperature and pressure conditions in volume 18 before taking further temperature and pressure measurements with sensors 20, 22. In some arrangements, the heater 24 is turned on to apply heat in the canister volume 18 at any point prior to, during, or after input of fuel into the canister volume 18.

Figure 3:
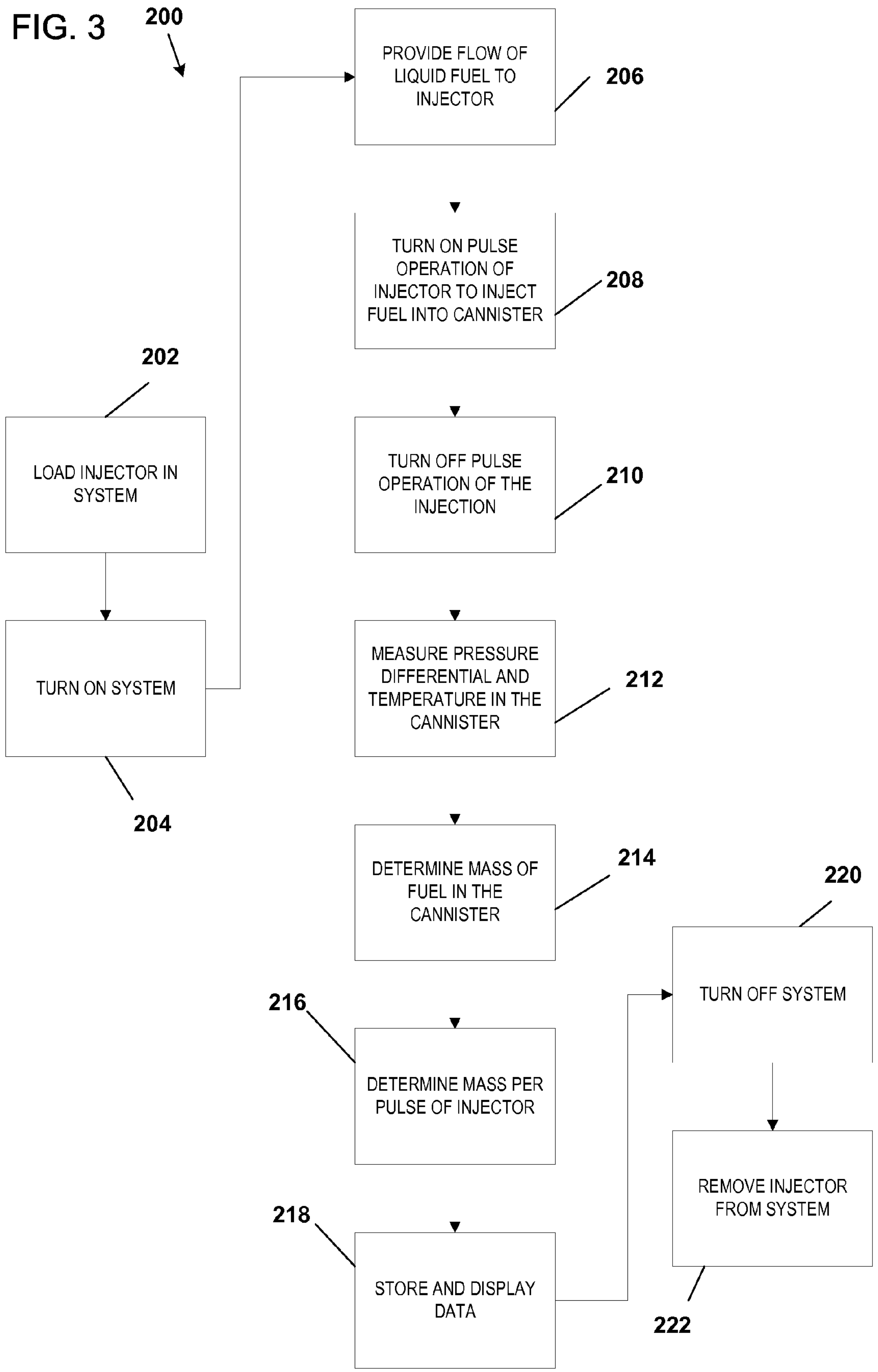
FIG. 3 illustrates a flowchart of methods and systems for operating an example injector test system of the present disclosure.

Referring now to FIG. 3, an example method of calibrating and/or testing of an LPG injector is described. The steps of the methods shown in FIG. 3 can be performed in whole or in part by the systems 10, 100 described above with reference to FIGS. 1 and 2.

The method is instantiated at a module 202 wherein an injector is loaded into the system. Operational flow proceeds to the next module 204 wherein the system is turned on. Operational flow proceeds to another module 206 wherein flow of liquid fuel is provided to the injector. Operational flow proceeds to another module 208 wherein pulse operation of the injector is turned on to inject fuel into a canister in a plurality of burst cycles. Operational flow proceeds to module 210 wherein pulse operation of the injector is turned off.

In a further module 212, a pressure differential and a temperature are measured in the canister internal volume. Operational flow proceeds to module 214 wherein a mass of fuel in the canister is determined followed by determination of a mass per pulse of the injector in a module 216. Operational flow proceeds to module 218 wherein data is stored and displayed. Operational flow proceeds to module 220 wherein the system is turned off followed by module 220 wherein the tested injector is removed from the system.

While the modules shown in FIG. 3 are arranged in a particular order and numbered sequentially, any one of the modules can be substituted for another to rearrange the sequence in which any one of the modules is arranged. Furthermore, additional modules, steps and functionality can be added at any point in the illustrated diagram of FIG. 3.

Figure 4:
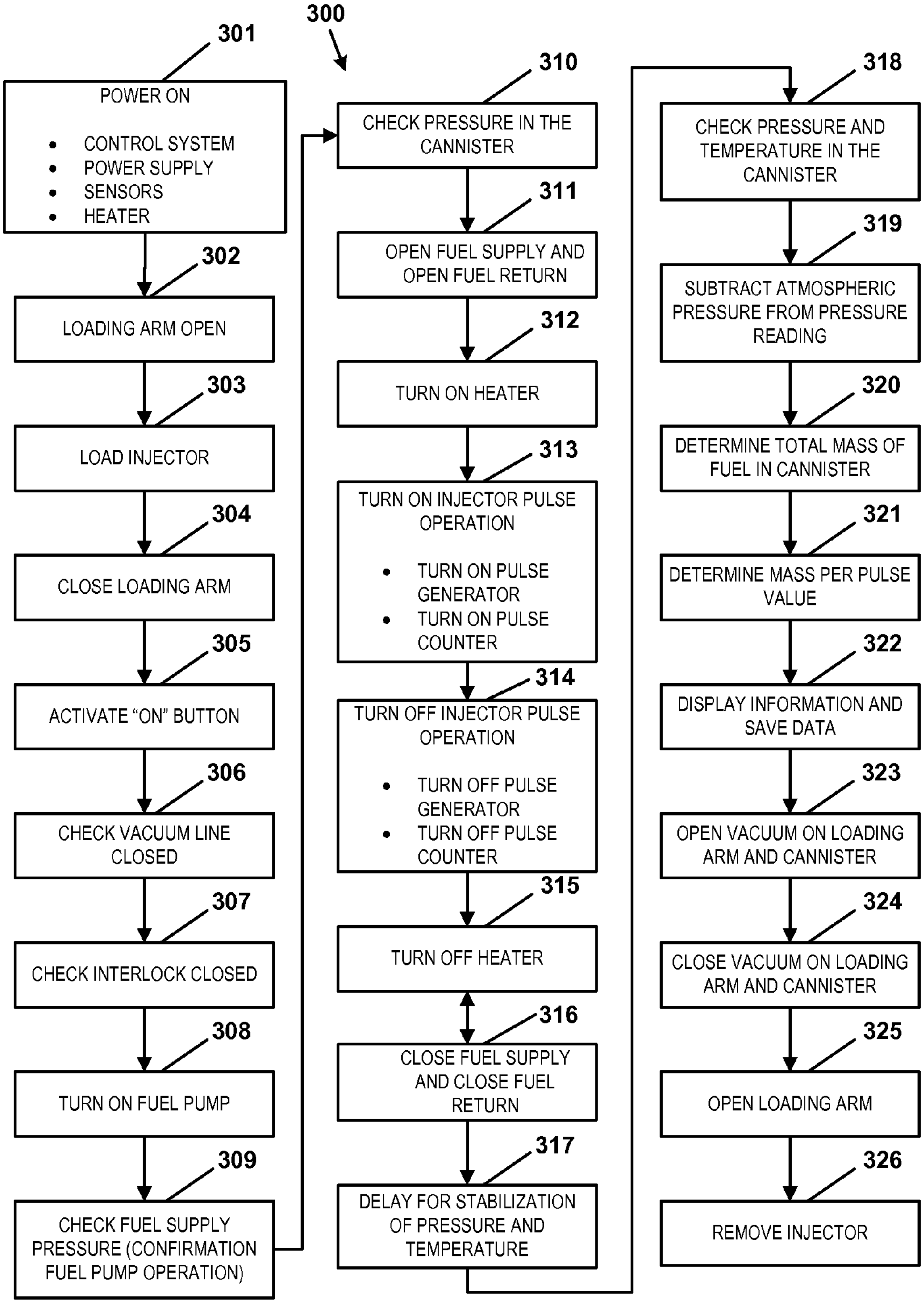
FIG. 4 illustrates a flowchart of methods and systems for operating another example injector test system of the present disclosure.

Referring to FIG. 4, another example method of testing and/or calibrating an LPG fuel injector is described. The steps, features and operation described with reference to FIG. 4 can be performed in whole or in part by either one of the systems 10, 100 described above with reference to FIGS. 1 and 2. Further, any single one or group of steps, features and functionality described with reference to FIG. 4 can replace or be added to any one of the modules described above with reference to FIG. 3. Still further, while the steps, features and functionality described with reference to FIG. 4 are provided in a particular sequence both in FIG. 4 and in the following description, no such particular sequence is required and any one of the aspects of FIG. 4 can be interchanged or reordered with another. Furthermore, the various steps, features and functionality described with reference to FIG. 4 are not all required in any particular system or operation, nor is the illustrated list of steps, features and functionality exhaustive as to what a system or method in accordance with principles of the present disclosure might include.

FIG. 4 illustrates modules 301-325 for an example system method 300. The system 300 is instantiated with a module 301 in which power is turned on. The module 301 can include powering on various features of the system including, for example, a control system, a power supply, sensors, a heater, and other features.

Operational flow proceeds to a module 302 wherein a loading arm of the system is actuated to permit loading of the injectors according to a module 303. Operational flow proceeds to module 304 in which the loading arm is closed. Module 304 typically includes providing a sealed connection between the loading arm and the fuel injector. Closing the loading arm can also provide sealed fluid communication between the injector and an internal volume of a canister of the system.

Operational flow proceeds to module 305 wherein an on button is activated to initiate a test cycle of the injector. The module 305 can result in a module 306 wherein a vacuum line closed check is performed, a module 307 wherein interlock closed check is performed, a module 308 wherein a fuel pump is turned on, a module 309 wherein a fuel supply pressure is checked, a module 310 wherein a pressure in the canister is checked, a module 311 wherein the fuel supply and fuel return are opened, and a module 312 wherein the heater is turned on.

Although alternatives are possible, the modules 306-312 can be performed and substantiated prior to a module 313 wherein an injector pulse operation is initiated or otherwise turned on. The module 313 can include turning on a pulse generator of the injector, and turning on a pulse counter of the injector. Turning on the pulse generator typically results in operation of the injector to inject liquid fuel into the canister. Typically, module 313 remains active to maintain pulsing of the injector until a certain number of pulses have been counted. Operational flow then proceeds to a module 314 wherein the injector pulse operation is turned off. The module 314 can include turning off the pulse generator and turning off the pulse counter.

Operational flow can then proceed to a module 315 wherein the heater is turned off. After the heater is turned off in module 315, the fuel supply and the fuel return are closed in a module 316. Module 316 is followed by a module 317 wherein a delay occurs during which pressure and temperature conditions are stabilized within the canister.

Module 317 can be followed by a module 318 wherein the pressure and temperature in the canister are checked. Module 318 typically further includes a confirmation against predetermined threshold levels to ensure that the pressure and temperature condition in the canister are within system requirements. Operational flow can then proceed to a module 319 wherein the atmospheric pressure is subtracted from the pressure reading as part of determining a pressure differential value. In a module 320 a total mass of fuel in the canister is determined. The module 320 can include performing a calculation using a particular equation or executing an algorithm. An example equation for use in determining of mass according to module 320 includes the following:

$$PV=mRT \quad \text{Equation 1}$$

Where:
P=pressure differential
V=volume
m=mass
R=gas constant
T=temperature
Equation 1 can be rearranged to solve for mass:

$$m=\frac{PV}{RT} \quad \text{Equation 2}$$

The value of R is known for the fuel (e.g., the gas constant of LPG). The volume of the canister is known. The pressure differential and temperature are determined in modules 318 and 319.

Operational flow then proceeds to a module 321 wherein mass per pulse is determined for the injector using the total number of pulses (e.g., 100 or 700 from the examples #1 and #2 above). The value provided in module 321 can be displayed and saved according to a module 322 information is displayed and data is saved.

Operational flow can then proceed to a module 323 wherein a vacuum is applied to the loading arm and canister to remove fuel stored in the canister and loading arm. The fuel removed under vacuum can be collected by, for example, a fuel recycle system. Operational flow proceeds to a module 324 wherein the vacuum on loading arm and canister are released. A module 325 wherein the loading arm is opened can be performed to again provide access to the injector. In a further module 326, the injector is removed.

The injector tested or otherwise calibrated according to the method and system 300 can be retested using a different configuration of modules 313-314. For example, the burst cycle used for pulse operation of the injector can have within a predetermined time interval different amounts of time in which the injector is in an open state versus when it is in a closed state (e.g., a full throttle vs. an idle burst cycle as described above). Test and calibration data for the injector under different burst cycle testing can be useful in determining overall performance characteristics of the injector.

According to one general aspect of the present disclosure, a method of testing an LPG injector with an injector test system is provided. The injector test system includes an LPG fuel source in fluid communication with an input to the LPG injector, a fuel canister in fluid communication with an output of the LPG injector, a canister pressure sensor, a canister temperature sensor, and a control system. The method can include activating the injector between an open state and a closed state in a plurality of cycles, determining a change in pressure in the canister with the pressure sensor, determining a temperature in the canister, determining a total mass of fuel in the canister using the determined change in pressure, the determined temperature, a known gas constant for LPG, and a volume of the canister, and determining a mass of LPG injected by the injector during each cycle.

Another general aspect of the present disclosure relates to a liquid petroleum gas (LPG) test system for calibration of an LPG injector. The system can include a source of LPG coupled in fluid communication with the injector, a canister defining a volume, wherein the volume arranged in fluid communication with the injector, a canister pressure sensor configured to monitor a pressure condition in the canister volume and generate a pressure signal, and a canister temperature sensor configured to monitor a temperature condition in the canister volume. The system can also include a control system configured to activate the injector between open and closed states wherein LPG is injected through the injector into the canister volume, determine a change in pressure in the canister volume using the pressure signal, determine a mass of fuel injected into the canister volume using the pressure differential, the temperature condition, a gas constant for the LPG, and the canister volume, and determine a mass of LPG injected into the canister volume during each open state of the injector.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of testing an LPG injector with an injector test system, the injector test system including an LPG fuel source in fluid communication with an input to the LPG injector, a fuel canister in fluid communication with an output of the LPG injector, a canister pressure sensor, a canister temperature sensor, and a control system, the method comprising:

activating the injector between an open state and a closed state in a plurality of cycles;

determining a change in pressure in the canister with the pressure sensor;

determining a temperature in the canister;

determining a total mass of fuel in the canister using the determined change in pressure, the determined temperature, a gas constant for LPG, and a volume of the canister; and determining a mass of LPG injected by the injector during each cycle.

2. The method of claim 1, further comprising activating an on/off control mechanism to initiate the activating and determining steps.

3. The method of claim 1, further comprising storing data concerning the mass of LPG injected by the injector during each cycle.

4. The method of claim 1, further comprising displaying data concerning the mass of LPG injected by the injector during each cycle.

5. The method of claim 1, wherein activating the LPG injector includes maintaining the injector in the open state in the range of about 1 to about 10 ms and maintaining the closed state in the range of about 10 to about 19 ms during a 20 ms cycle.

6. The method of claim 1, wherein activating the LPG injector includes maintaining the injector in the open state in the range of about 10 to about 19 ms and maintaining the closed state in the range of about 1 to about 10 ms during a 20 ms cycle.

7. The method of claim 1, further comprising activating a vacuum pressure condition to the canister to remove LPG in the canister.

8. The method of claim 7, further comprising recycling fuel collected from application of the vacuum pressure condition.

9. The method of claim 1, wherein the system further includes a loading arm arrangement, the loading arm arrangement configured to couple the LPG injector in fluid communication with a fuel supply line and a fuel return line of the fuel source.

10. The method of claim 9, further comprising actuating the loading arm to provide a sealed connection between the fuel source, the LPG injector and the canister volume.

11. The method of claim 10, wherein the loading arm arrangement includes an interlock sensor configured to confirm whether the sealed connection between the fuel source, the LPG injector and the canister volume exists.

12. The method of claim 9, further comprising disconnecting the LPG injector from fluid communication with the fuel source and the canister volume.

13. The method of claim 12, further comprising applying a vacuum pressure condition to the loading arm and the canister volume before the step of disconnecting the LPG injector.

14. A liquid petroleum gas (LPG) test system for calibration of an LPG injector, the system comprising:

a source of LPG coupled in fluid communication with the injector;

a canister defining a volume, the volume arranged in fluid communication with the injector;

a canister pressure sensor configured to monitor a pressure condition in the canister volume and generate a pressure signal;

a canister temperature sensor configured to monitor a temperature condition in the canister volume; and a control system configured to:

activate the injector between open and closed states wherein LPG is injected through the injector into the canister volume;

determine a change in pressure in the canister volume using the pressure signal;

determine a mass of fuel injected into the canister volume using the pressure differential, the temperature condition, a gas constant for the LPG, and the canister volume; and determine a mass of LPG injected into the canister volume during each open state of the injector.

15. The system of claim 14, further comprising a fuel recovery system, the fuel recovery system including a vacuum return line coupled to the canister volume, the vacuum return line configured to apply a vacuum pressure condition to the canister volume to remove LPG from the canister volume.

16. The system of claim 14, further comprising a plurality of canisters adapted to test a plurality of LPG injectors.

17. The system of claim 14, further comprising an on/off control arrangement configured to activate an on/off state of at least the temperature sensor, the pressure sensor, and control system.

18. The system of claim 14, further comprising a loading arm arrangement couple between the source of LPG and the injector, the loading arm arrangement configured to connect in fluid communication with a fuel supply and a fuel return of the source of LPG, and having an injector connector arrangement to couple in fluid communication with the injector.

19. The system of claim 18, wherein the loading arm arrangement further includes an actuator arrangement configured to create a sealed connection between the injector, the loading arm, and the canister volume.

20. The system of claim 19, wherein the actuator arrangement further includes an actuator interlock sensor configured to confirm the sealed connector.

* * * * *